(12) United States Patent
Shaw (10) Patent No.: US 8,806,103 B2
(45) Date of Patent: Aug. 12, 2014

(54) SYSTEM AND METHOD FOR INTERLEAVING MEMORY

(75) Inventor: Mark E. Shaw, Garland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 260 days.

(21) Appl. No.: 10/833,582

(22) Filed: Apr. 28, 2004

(65) Prior Publication Data

US 2005/0246508 A1 Nov. 3, 2005

(51) Int. Cl.
*G06F 12/00* (2006.01)

(52) U.S. Cl.
USPC ............................ 711/5; 711/157; 711/165

(58) Field of Classification Search
None
See application file for complete search history.

(56) References Cited

U.S. PATENT DOCUMENTS

| | | | | |
|---|---|---|---|---|
| 5,428,758 | A | * | 6/1995 | Salsburg ..................... 711/165 |
| 5,497,478 | A | | 3/1996 | Murata |
| 5,530,837 | A | * | 6/1996 | Williams et al. ............ 711/157 |
| 5,574,851 | A | * | 11/1996 | Rathunde .................... 714/6.32 |
| 5,579,277 | A | | 11/1996 | Kelly |
| 5,748,914 | A | * | 5/1998 | Barth et al. ................. 710/105 |
| 5,765,182 | A | | 6/1998 | Lau et al. |
| 5,924,111 | A | | 7/1999 | Huang et al. |
| 5,940,863 | A | | 8/1999 | Fimoff et al. |
| 6,131,146 | A | | 10/2000 | Aono |
| 6,275,892 | B1 | * | 8/2001 | Arnott .......................... 710/200 |
| 6,356,991 | B1 | * | 3/2002 | Bauman et al. .............. 711/209 |
| 6,393,533 | B1 | * | 5/2002 | Mende et al. ................ 711/156 |
| 6,480,943 | B1 | * | 11/2002 | Douglas et al. .............. 711/157 |
| 6,629,219 | B1 | | 9/2003 | Manseau |
| 6,684,361 | B2 | | 1/2004 | Tong et al. |
| 2002/0174419 | A1 | * | 11/2002 | Alvarez et al. ............... 717/168 |
| 2003/0167383 | A1 | | 9/2003 | Gupta et al. |
| 2004/0019751 | A1 | * | 1/2004 | Sharma et al. ............... 711/154 |
| 2005/0135176 | A1 | * | 6/2005 | Ramakrishnan et al. 365/230.01 |

OTHER PUBLICATIONS

Sun Microsystems, Inc., "Sun Enterprise 10000 Dynamic Reconfiguration User's Guide", May 1999, pp. 1-66.
Mark E Shaw, "Superdome", www.interex.org/pubcontent/enterprise/sep01/shaw.jsp, Sep. 2001, pp. 1-6.
Tatsuhide Senta, et al., "Itanium2 32-way Server System Architecture", NEC Res & Develop. vol. 44, No. 1, Jan. 2003, pp. 8-12.
Faye Briggs, et al., "The Intel® 870 Family of Enterprise Chipsets", Enterprise Products Group Intel® Corporation Hot Chips XIII, (Date Unknown), pp. 1-27.

* cited by examiner

*Primary Examiner* — Kaushikkumar Patel (57) ABSTRACT

One system may comprise an interleave system that determines a desired interleave for at least a selected portion of a distributed memory system. A migration system is associated with the interleave system to migrate blocks of data from first assigned memory locations of the distributed memory system to second interleaved memory locations of the distributed memory system to implement the desired interleave.

24 Claims, 5 Drawing Sheets

|        | CELLS  |        |        |
|--------|--------|--------|--------|
|        | CELL 0 | CELL 1 | CELL 2 |
| REG 4  | 6      | 7      | 3      |
| REG 3  | 4      | 5      | 2      |
| REG 2  | 2      | 3      | 1      |
| REG 1  | 0      | 1      | 0      |

FIG. 5 — 152

|        | CELLS  |        |        |
|--------|--------|--------|--------|
|        | CELL 0 | CELL 1 | CELL 2 |
| REG 4  | 1      | 2      | 3      |
| REG 3  | 6      | 7      | 0      |
| REG 2  | 3      | 4      | 5      |
| REG 1  | 0      | 1      | 2      |

FIG. 6 — 154

|        | CELLS  |        |        |
|--------|--------|--------|--------|
|        | CELL 0 | CELL 1 | CELL 2 |
| REG 4  | 0      | 1      | 3      |
| REG 3  | 4      | 5      | 2      |
| REG 2  | 2      | 3      | 7      |
| REG 1  | 0      | 1      | 6      |

FIG. 7 — 156

|        | CELLS  |        |        |
|--------|--------|--------|--------|
|        | CELL 0 | CELL 1 | CELL 2 |
| REG 4  |        |        |        |
| REG 3  | 6      | 7      |        |
| REG 2  | 3      | 4      | 5      |
| REG 1  | 0      | 1      | 2      |

FIG. 8 — 158

| CELLS | | | |
|---|---|---|---|
| | CELL 0 | CELL 1 | CELL 2 |
| REG 4 | | 3 | 6 |
| REG 3 | | 7 | 0 |
| REG 2 | | 4 | 5 |
| REG 1 | | 1 | 2 |

SYSTEM AND METHOD FOR INTERLEAVING MEMORY

BACKGROUND

In multi-processor systems, memory can be configured to improve performance. One approach is to spread memory across different memory controllers, which approach is referred to as interleaving. A desirable interleave distributes memory substantially evenly across available memory controllers. As memory is more evenly distributed, large contiguous arrays of data touch each of the memory controllers substantially the same amount. Therefore, by interleaving memory, the memory is more evenly distributed so as to mitigate hot spots. Hot spots can occur, for example, if a given memory controller is overloaded due to unevenly large distributions of contiguous data being locally associated with the given memory controller.

SUMMARY

One embodiment of the present invention may comprise a system that includes an interleave system that determines a desired interleave for at least a selected portion of a distributed memory system. A migration system is associated with the interleave system to migrate blocks of data to implement the desired interleave.

Another embodiment of the present invention may comprise a system that includes an interleave system that dynamically re-interleaves at least a selected portion of a distributed memory system to implement a desired memory interleave in response to a stimulus. A mapping system provides memory location information in response to an input associated with data, the memory location information being updated based on the dynamically re-interleaving of the at least a selected portion of the distributed memory system.

Another embodiment of the present invention may comprise a distributed memory, multi-processor system. The distributed memory, multi-processor system includes a plurality of cells communicatively coupled to each other, each of the plurality of cells comprising a cell controller and cell memory, the cell memory of the plurality of cells collectively defining a memory system. The cell controller of at least one of the plurality of cells further comprising an interleave system configured to dynamically interleave selected memory regions of the main memory of at least some of the plurality of cells by modifying a first memory distribution of the memory system to provide a desired memory interleave for the memory system.

Another embodiment of the present invention may comprise a method that includes ascertaining a desired memory interleave for at least a selected portion of a distributed memory system, and migrating blocks of data from first respective memory locations associated with the blocks of data to second respective memory locations based on the desired memory interleave.

Another embodiment of the present invention may comprise a distributed memory multi-processor system configured to dynamically interleave and re-interleave memory across a plurality of memory modules located in different cells of the distributed memory multi-processor system, the different cells being communicatively coupled to each other.

DETAILED DESCRIPTION

Figure 1:
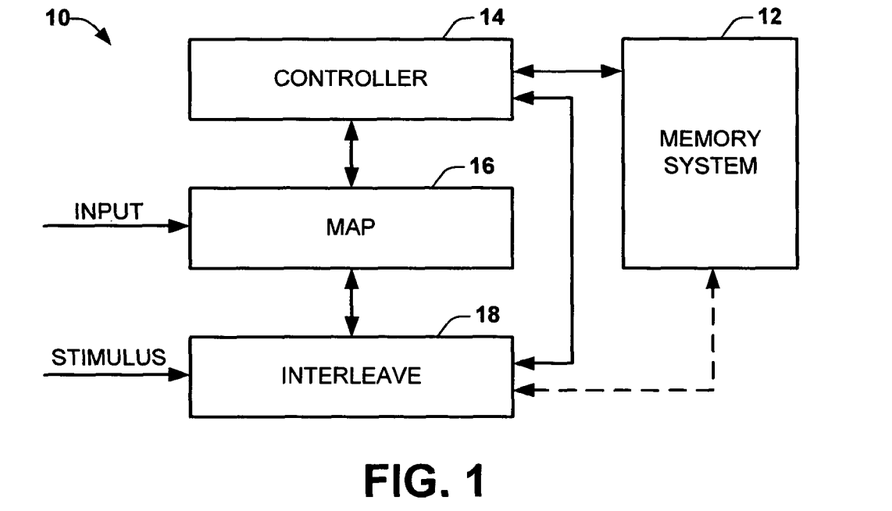
FIG. 1 depicts an embodiment of a system for interleaving memory.

FIG. 1 depicts a schematic example of a system 10 for interleaving memory. The system 10 can be utilized to dynamically interleave various portions of a memory system 12. The system can be employed in the context of a distributed memory multi-processor system, in which the memory system includes a plurality of physical memory devices distributed in the multi-processor system.

As an example, one type of multi-processor system is a Cache Coherency Non-Uniform Memory Access (ccNUMA) architecture, although other distributed-memory multi-processor architectures can also implement the system 10 described herein. A typical ccNUMA multi-processor system includes a plurality of memory structures that may define the memory system 12. The memory structures can include a plurality of memory modules (e.g., dual-inline memory modules (DIMM) or single in-line memory modules (SIMM)) distributed across a plurality of cells in the multi-processor system. For example, a cell can correspond to an aggregation of memory, such as implemented on a cell board that contains one or more memory modules. Additionally, the memory system 12 can include virtual memory implemented (e.g., by the operating system) in the multi-processor system.

The system 10 includes a controller 14 that is operatively associated with the memory system 12. For example, the controller 14 may be communicatively coupled locally (e.g., via a local bus or interconnect) with a first subset of memory in the memory system 12 and communicatively coupled remotely (e.g., via a backplane or interconnect) to one or more other subsets of memory in the memory system 12. Each of the other subsets of the memory system 12 can include one or more memory modules or memory subsystems. Thus, each respective cell of the multi-processor system can include one or more memory subsystems that collectively form the memory system 12.

In a multi-processor system that includes a plurality of cells, a controller (e.g., a cell controller) similar to the controller 14 can be employed for controlling each of the plurality of cells. The cell controllers can be communicatively connected to each other to provide shared access to the distributed memory of the memory system 12. For instance, cell controllers can be communicatively connected through one or more general interconnects or backplanes (e.g., implemented as crossbars).

The controller 14 is associated with a map system or component 16, such as can be implemented as a cell map. The map component 16 provides memory location information in response to an input associated with data. The memory location provided corresponds to the distribution of memory within the memory system 12. That is, the map component includes a plurality of entries that logically map to physical memory locations (or memory chunks) in the memory system 12. The entries in the map component 16 can be utilized to define a distribution of memory segments across the memory system 12 (or at least a portion of the memory system). The map component 16 can be implemented as hardware, software or a combination of software and hardware. While the map component 16 is illustrated as being separate from the controller 14, the map component can be implemented as part of the controller (e.g., a memory controller on a cell board).

The map component 16 can be implemented as a table having a plurality of rows and a plurality of columns, where each row corresponds to an interleaving entry, and each column within a row corresponds to an entry item that identifies one of the cells in the multi-processor system. For instance, each entry in the cell map can correspond to a contiguous chunk of memory in a respective cell, which can be a configurable block of memory. Different entries can be allocated to different physical regions of the memory system. The map component 16 provides memory location information for data in response to an input, such as a request for accessing data. The map component 16 can also identify the particular region of the identified cell associated with the input. The input can be any input that identifies a block of data, such as including a memory address or cache line address. The distribution of memory segments in the map component 16 can correspond to a memory interleave for at least a portion the memory system 12.

The system 10 also includes an interleave block 18 communicatively coupled with the controller 14. The interleave block 18 is operative to interleave chunks of memory in the memory system 12. That is, the interleave block 18 dynamically re-interleaves at least a selected portion of the memory system 12 to achieve a desired memory interleave, such as by spreading or distributing memory across memory subsystems located at a plurality of different cells. The interleave block 18 can implement an interleaving (or re-interleaving) process in response to a predefined stimulus. The stimulus can be provided by the controller 14, the operating system or other hardware or software components operating in the distributed memory system.

The predefined stimulus can be a run-time stimulus, such as may be provided during normal operation of the distributed memory system. For example, the interleave block 18 can re-interleave memory in the memory system 12 in response to adding memory to the memory system. Alternatively, or additionally, the interleave block 18 can re-interleave data if one or more memory segments are deleted from interleaved memory of the memory system 12. Memory can be deleted, for example, if a cell is removed from the multi-processor system or if one or more memory modules are removed from system operation. The addition or deletion of memory to the memory system 12 can occur in conjunction with the addition or deletion of a cell that includes the respective memory. Another possible stimulus for initiating re-interleave of memory corresponds to reallocating memory among two or more existing partitions of the memory system 12. For instance, a given partition of the memory system 12 may initially contain a certain percentage of local memory and another percentage of interleaved memory. The interleave block 18 can be instructed or otherwise determine that a different mix of local and interleaved memory is desired. Additionally or alternatively, the allocation of memory amongst different partitions can be modified by the interleave block 18.

While the interleave block 18 is illustrated as being separate from the controller 14, the interleave block could also be implemented as part of the controller. Those skilled in the art will understand and appreciate that the interleave block 18 can be employed to interleave data in response to various other stimuli, such as in response to an appropriate system command from the operating system (e.g., a request to interleave memory with existing interleaved or non-interleave memory). Since the interleaving does not require system reboot or stalling of system operation, an interleave operation can be implemented whenever desired, such as to optimize performance (e.g., by providing a predefined stimulus to initiate the interleave).

By way of example, the interleave block 18 implements the re-interleaving by first determining a desired interleave for the memory system 12. This example assumes that the memory system 12 forms a memory domain spread across plural cells, which may correspond to a portion of the memory that exists in a multi-processor system. The interleave block 18 can include software and/or hardware that determines the desired interleave. For example, the interleave block 18 examines the available memory in each cell, as the available memory can provide a potential destination for at least a portion of memory that is moved during the re-interleaving. The interleave block 18 then identifies the memory locations that are to be moved in connection with the interleaving. The interleave block 18, for example, provides an indication of the identified memory locations to a migration system (not shown) to migrate the data according to the desired interleave determined by the interleave block 18.

By way of further example, the migration can be implemented by the controller 14 or other hardware taking ownership of blocks of data. For instance, the interleave block 18 can be configured to implement selected functions of the controller, in which case the interleave block may communicate with the memory system directly, as indicated by a dotted line. The blocks of data are then moved from selected locations associated with a first set of memory locations in the memory system 12 (e.g., corresponding to either a non-interleaved or original interleaved configuration) to selected destinations within a second set of memory locations of the memory system. The resulting memory locations for the data provide the desired interleave.

In order to facilitate migrating the data during a re-interleaving process, the controller 14 can temporarily prevent access to the selected memory locations by other devices in the system 10 during their transfer. For example, the controller 14 or other systems implementing the migration can set an associated status bit of each memory block so that the memory block is placed "on hold" during migration. While "on hold," a memory block is unable to respond to requests for data at such memory location during migration. Those skilled in the art will appreciate various approaches that can be employed to prevent access to a memory block during migration as well as to accommodate requests that consequently might fail during the migration phase of interleaving.

After a block of data has been moved from the first memory location into the selected destination memory location, access to the data can be re-enabled. For example, the controller 14 can reset the associated status bit of the memory block. The interleave block 18 also updates the map component 16 based on the migration so that the map component properly identifies the location of individual memory segments in the domain of the memory system 12. Accordingly, the map component 16 provides correct location information (e.g., which cell and memory region of the cell) for data, such as in response to a request for the data (e.g., issued by a processor to the controller 14). The map component 16 thus provides information for routing a request for data to a correct cell, which may be local or remote relative to the controller 14, to enable efficient access to such data.

For example, assume that a microprocessor (e.g., either a local processor associated with the controller 14 or a remote processor associated with a different cell controller) issues a request for data that results in a cache miss. The request is thus provided to the controller 14 for accessing main memory 12. The controller 14 can forward the request from the processor to an appropriate cell that owns the requested data based on the entries in the map component 16. The controller associated with the cell receiving the request can, in turn, implement the request by accessing the data resident at such cell. In contrast, if the input request is for data in the same cell in which the microprocessor is co-located, the controller 14 can access the data from corresponding local memory in the memory system 12.

In view of the foregoing, those skilled in the art will understand and appreciate that re-interleaving can be implemented dynamically, without requiring reboot or stalling the system. As a result, re-interleaving can be implemented any time to improve performance, including before or after memory addition or deletion. Additionally, the system 10 enables deletion of memory on multi-processor systems that have interleaved memory.

Figure 2:
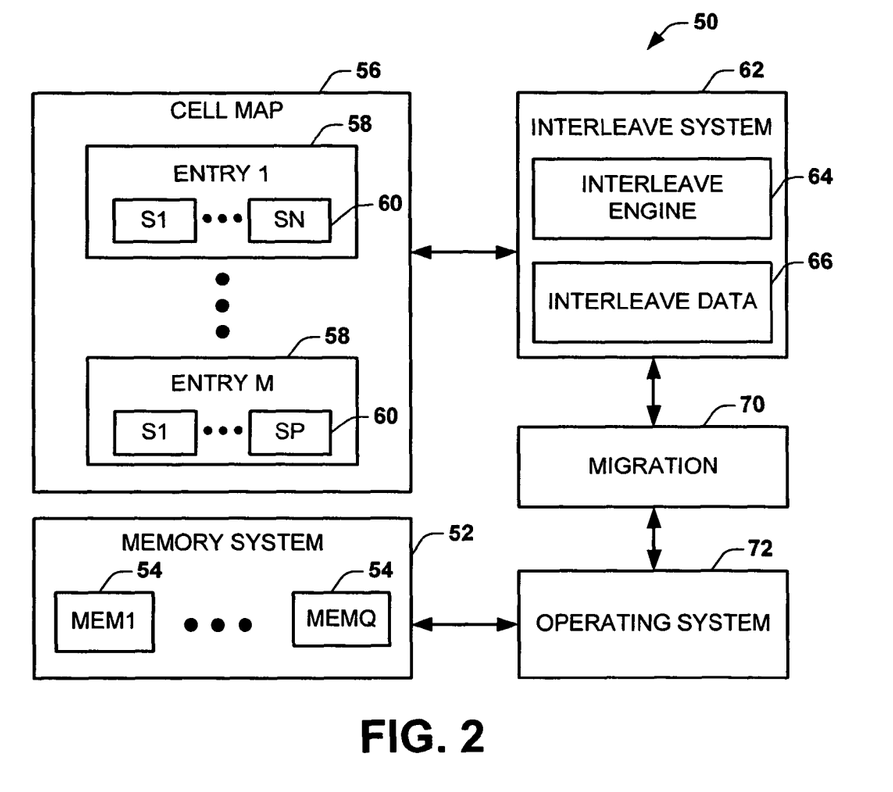
FIG. 2 depicts another embodiment of a system for interleaving memory.

FIG. 2 depicts an example of a system 50 that can be utilized for interleaving locations of an associated memory system 52. The memory system 52 can include memory subsystems 54. The memory system 52 includes a plurality of memory subsystems 54 indicated as MEM 1 through MEM Q, where Q is a positive integer greater than or equal to one denoting the number of memory subsystems. The memory system 52 can include one or more memory subsystems 54 for each respective cell. The memory subsystems 54 can each include the same or a different amount of memory, which can be configurable.

A cell map 56 includes a plurality of entries 58, indicated as ENTRY 1 through ENTRY M, where M is an integer greater than or equal to one denoting the number cell map entries. Each entry 58, for example, corresponds to a memory region or partition that includes one or more subentries 60. As an example, a given entry 60 can correspond to an operating instance (e.g., a server) running on an associated multi-processor system. Different entries 58 can also be employed to identify local memory locations (e.g., within the same cell) and remote memory locations (e.g., located in different cells). Each entry can include a configurable amount of memory, such as may be required for the operating instance.

In ENTRY 1, the subentries 60 are indicated as S1-SN, and, for ENTRY M, corresponding subentries are indicated as S1-SP, where N and P are integers greater than or equal to one denoting the number of subentries. N and P typically are different values, although they could be the same. The subentries 60 in the respective cell map entries 58 each corresponds to a memory segment (a memory chunk) of the respective entry in the memory system 52. The memory chunks can be configurable memory segments. For example, each subentry 60 can correspond to a fixed number of bytes, such as 0.5 gigabytes. Alternatively, different subentries 60 in the cell map 56 can correspond to different sized memory locations. The subentries 60 and entries 58 in the cell map 56 thus identify corresponding logical units of memory and the interleaving associated with the memory subsystems 54.

The cell map 56 can be implemented as a content addressable memory (CAM) or other structure that can be used to ascertain a location of data. In the context of a multi-processor system, the cell map 56 can provide location information as a function of a tag address for a given line of data, which tag address operates as a search field utilized by the camming function provided by the cell map. The tag address can be defined by the cache coherency protocol being implemented in the multi-processor system. The cell map 56 thus provides an indication of a given cell (e.g., a cell number) and/or other location information (e.g., region of a given cell) associated with the given line of data being requested. The tag address can be provided to the cell map 56 as part of a request for data (e.g., a read or write request from a processor or from an input/output device).

The system 50 also includes an interleave system 62 that is operative to interleave memory locations of the memory system 52. The interleaving of memory in at least a portion of the memory system 52 is reflected in the various subentries 60 of the respective cell map 56. For example, in a cell map 56 having forty-nine entries 58, one entry (e.g., entry M) can include 64 subentries and the remaining 48 entries each can include 16 subentries. A contiguous array of data can be distributed across the subentries of different cells with each of the entries. It is to be understood that the cell map 56 can provide interleaving information for one or more memory domains that form the memory system 52.

The interleave system 62 includes an interleave engine 64 that is programmed and/or configured to control memory interleave. In response to a stimulus to implement memory interleaving, the interleave engine 62 determines the amount of memory in a given memory domain that is available for interleaving. The domain of available memory corresponds to at least a portion of the memory system 52. The determination of available memory can be performed by the interleave engine 62 providing a system request to the memory system 52 to ascertain available (e.g., unused) memory in each of the memory subsystems 54 that can be utilized as part of an interleaving process. As described herein, the interleaving system 62 can operate to perform re-interleaving when memory is added or deleted, such as will occur in conjunction with adding or deleting a respective cell of a multi-processor system. Additionally, the interleave system 60 can perform interleaving at any time to improve performance, such as to reallocate memory amongst two or more partitions in the memory system 52.

After determining the amount of available memory for interleaving, the interleave engine 64 can aggregate and assign a selected portion of the available memory to a cell map entry 58. For example, the interleave engine 64 can determine a largest power of two for available memory and assign such memory to one or more entries 58 having a plurality (e.g., 64) subentries 60 in the entry. The remaining available memory can then be assigned to subsequent other of the cell map entries 58, each of which may have a smaller number of subentries 60 (e.g., 16 subentries per cell map entry). In this way, the cell map 56 provides an address map for data in the memory system 52, which can include one large cell map entry 58 and a plurality of smaller entries 58 having fewer subentries relative to the large entry.

The interleave engine 64 also employs a re-interleaving algorithm to examine the memory system 52 and to determine a desired interleave for the memory. The interleave engine 64 employs the interleave algorithm to generate interleave data 66 based on the memory available for interleaving and the desired interleave for such data. The interleave data 66 specifies how memory should be migrated in the memory system 52 to provide the desired interleave determined by the interleave engine 64. The interleave data 66 can identify the distribution of memory (e.g., how contiguous memory is spread across the memory subsystems 54) based on the stimulus that caused the interleave or re-interleave to occur. The interleave of the memory system 52 will vary depending on, for example, if one or more memory subsystems 54 are added to the memory system 52, as well as if memory subsystem 54 are deleted. Those skilled in the art will appreciate various algorithms that can be utilized to implement the desired interleave to improve performance, such as by mitigating hot spots.

A migration system 70 is utilized to transfer data as part of the interleaving process based on the interleave data 66. The migration system 70 can be implemented as a migration hardware component, although the migration system can be implemented as software or a combination of software and hardware. The migration system 70 is operatively associated with an operating system 72 of the multi-processor system. The operating system 72 can control some or all of the interactions between the migration system 70 and the memory system 52, as well as interactions between other aspects of the system 50 and the memory system 52. The interleave system 62 invokes the migration system 70 (e.g., via a predefined migration instruction or request) to cause migration to occur in connection with implementing interleaving based on the interleave data 66. As described herein, this can occur in response to adding or removing memory as well as other stimuli, such as associated with performing memory optimization.

As an example, it is assumed that new memory (e.g., one or more subsystems 54) has been added to the memory system 52, such as can occur in response to a new cell being added to a multi-processor system. The new cell is communicatively coupled to the existing cells via an interconnect or backplane system. The interleave system 62 enables the migration system 70 to take initial ownership of the new memory added to the memory system 52. The migration system 70 is operative to prevent access to respective memory blocks in the new memory of the memory system 52 until the migration and interleaving have been completed. The access can be prevented temporarily, for example, by stalling each memory block (e.g., a cache line) during migration of the block. The ownership of the new memory by the migration system 70 thus can be utilized to mitigate race conditions and preclude use of the new memory or selected portions thereof until it has been appropriately interleaved into the memory system 52.

Those skilled in the art will understand and appreciate various mechanisms that can be utilized by the migration system 70 to prevent access to the memory blocks that are being interleaved, including mechanisms typically resident in the operating system 72. Additionally, cache coherency protocols implemented in the system can set the new memory to a busy (or otherwise inaccessible) condition so that requests for the data will be blocked until the migration and interleaving is completed. Another technique that can be utilized to block access to the memory that is being interleaved is to load requests for blocked memory into a queue structure, such as can be implemented separately from or part of the main memory system 52. After a memory block has been released by the migration system 70, indicating that migration of the block has been completed, associated queued requests can then be processed.

The migration system 70 can also perform migration for selected memory blocks of the original interleaved memory. By way of continuing example, the migration system 70 can issue a request to old or existing memory locations in the memory system 52 for each block of such memory that is to be migrated in connection with interleaving the new memory. Each block of memory to be migrated can correspond to a cache line, a plurality of lines or any size block that may be appropriate for the system 50. As part of the migration process, the migration system 70 accesses the old (e.g., previously interleaved) memory to obtain a current version of the data from the selected portions of memory being migrated.

Additionally, steps are taken to prevent access to the data that is being migrated from the existing memory locations. For example, if a memory block has been accessed by the migration system 70, then all subsequent requests to data in that memory block are prevented temporarily. Those skilled in the art will understand and appreciate that substantially the same mechanisms for blocking access to the new memory (as mentioned above) can be used for blocking access to the data in existing memory that is being migrated. The migration system 70 thus obtains ownership of the current version of the data from the existing memory block. The migration system 70, in turn, transfers the data to the corresponding location in the new memory as defined by the interleave data 66.

A migration acknowledgement can be issued in response to receiving the data from the existing memory to indicate that data migration has occurred successfully. The memory controller associated with the old memory location can appropriately mark the data as "gone" in response to the migration acknowledgement. The "gone" marking can be employed by the operating system or other aspects of the cache coherency protocol to identify that a particular line of data is no longer at the old memory location. Additionally, the "gone" marking further can be utilized to provide a pointer to or otherwise identify the new memory location to which the data has been migrated as part of the memory interleave. The migration system 70 can also inform the interleave system 60 that migration has been completed for a given memory block to facilitate subsequent access to the data that has been re-interleaved.

The entries 58 and subentries 60 in the cell map 56 are also modified to reflect the migrated block of data. For example, the interleave system 62 or the migration system 70 can provide the update information to the cell map 56. The interleave process, including migration, can be completed on a memory block-by-block basis until the newly added memory has been interleaved as specified by the interleave data 66. By implementing the migration on a block-by-block basis, those skilled in the art will understand and appreciate that sufficiently small blocks can be migrated to mitigate the impact on overall system operation. As a result of migrating sufficiently small memory blocks, the interleaving and migration can be implemented dynamically during normal operation without requiring a system reboot or significantly affecting run time operation.

Alternatively or additionally, those skilled in the art will understand that the migration system 70 can be implemented using appropriate system supports of the operating system 72. For example, the migration system can employ virtual memory in the memory system 52 via the operating system 72 by temporarily migrating selected memory blocks to a hard disk drive or other types of storage medium. In this example, the migration system 70 can retrieve the data from virtual memory for transfer into the desired new memory location to which it is being migrated based on the interleave data 66.

Figure 3:
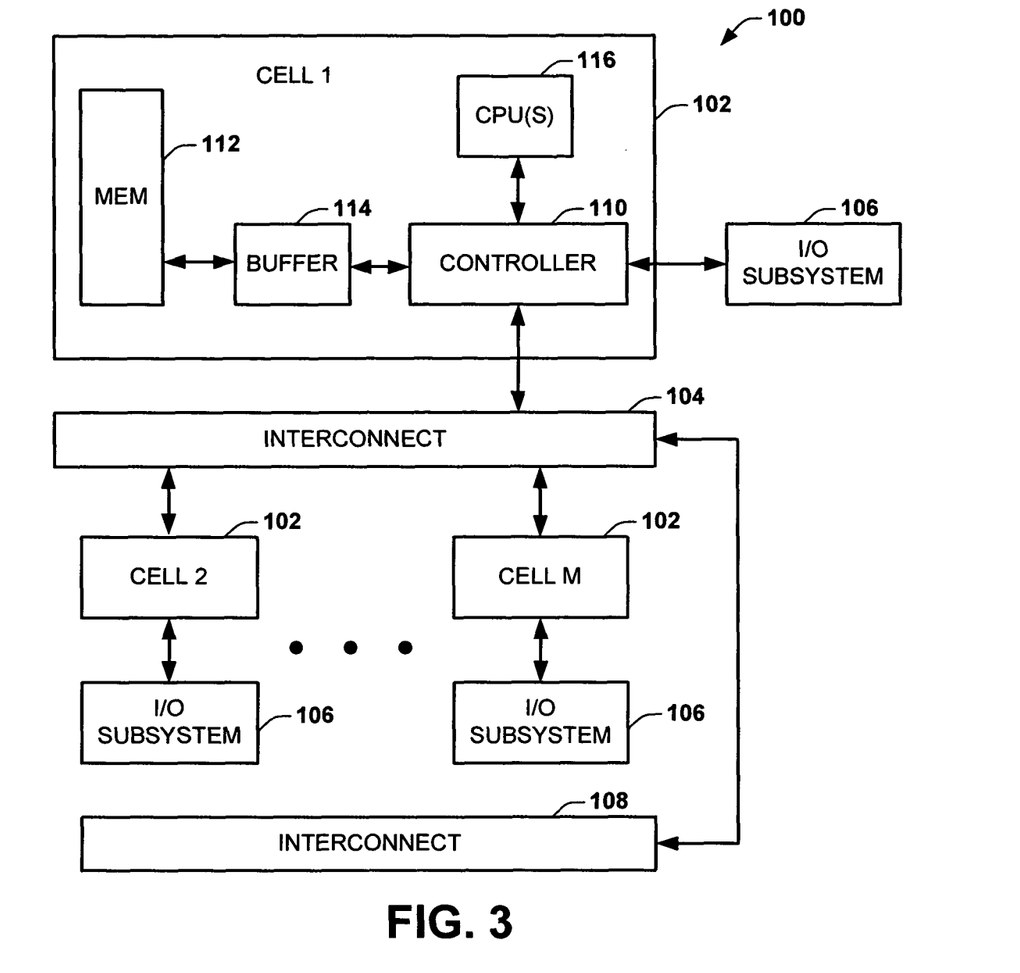
FIG. 3 depicts an example embodiment of a computer system that can implement memory interleaving.

FIG. 3 depicts a block diagram illustrating an example of a distributed-memory multi-processor system 100. The system 100 includes a plurality of cells 102 indicated respectively at CELL 1, CELL 2 through CELL M, where M is an integer greater than or equal to one denoting the number of cells. Each of the cells 102, which can be implemented as a cell board, is communicatively coupled to other cells via an interconnect 104, such as a backplane or crossbar structure.

An I/O (input/output) subsystem 106 is associated with each of the cells 102. The I/O subsystem 106 can provide an interface or pathway for accessing an associated bus structure (e.g., a PCI bus structure) or other devices, such as through corresponding adapter (not shown). Those skilled in the art will understand and appreciate various types of I/O devices that can be accessed or can access memory via the I/O subsystem 106. The I/O subsystem 106 can be implemented to include an application specific integrated circuit (ASIC) that provides an interface between each respective cell 102 and a corresponding bus structure having one or more input/output devices coupled to the corresponding bus structure.

Additionally, another interconnect 108 can be coupled to the interconnect 104 for accessing another cell-based architecture that includes one or more other cells (not shown). The other cell-based architecture can be similarly configured to that shown and described in FIG. 3. The interconnect 108 and associated cells (not shown) can be utilized for implementing larger capacity systems. Those skilled in the art will understand and appreciate that the system 100, however, can be implemented with any number of cells, with the interleaving being implemented as a function of the number of cells and the memory in each respective cell.

For purposes of brevity, the internal contents are shown only for CELL 1, although those skilled in the art will understand and appreciate that each of the other respective cells 102 can be implemented in a similar manner. Alternatively, different configurations could also be implemented relative to the different cells 102.

Turning to the contents of CELL 1, CELL 1 includes a cell controller 110 coupled to a cell memory subsystem 112 through an associated buffer network 114. The buffer network 114 can include a queue (e.g., an input queue and an output queue) to provide intelligent buffering of requests and responses between the memory subsystem 112 and controller 110. One or more central processing units (CPUs) 116 are also connected to the controller 110 for accessing the memory subsystem 112. Each of the CPUs 116 can include an associated cache (not shown) for storing data for local access by the CPU without requiring access to the memory subsystem 112. The CPUs 116 can implement a directory-based or non-directory-based cache coherency protocol. In the arrangement shown in FIG. 3, the CPUs 116 and the I/O subsystem 106 each can be considered memory accessing devices operative to access data in the memory subsystem 112 via the controller 110. The controller 110 can include firmware, a configuration and status register (CSR) and an ordered access queue for accessing the data in the memory subsystem 112.

The memory subsystem 112 can include any number of one or more memory modules, including one or more DIMM or SIMM memory devices. Memory modules can be installed into or removed from the memory system 112. The addition or removal of such memory modules can correspond to a stimulus that affects a characteristic of a memory domain in the system 100. As described herein, the controller 110 re-interleaves the aggregate memory in the system 100, as may be desired, in response to such a stimulus. The memory domain can include the memory in the memory subsystem 112, as well as corresponding memory subsystems in the other cells 102 (e.g., CELL 2 through CELL M) connected to CELL 1 through the interconnect 104, as well as other remote cells (not shown) having memory that may be coupled via the interconnect 108.

The interleaving or re-interleaving of memory in the system 100 can be implemented similar to that described with respect to FIG. 2. Briefly stated, in response to a predefined stimulus, the cell controller 110 determines the amount of memory in a given memory domain that is available for interleaving. After determining the amount of available memory for interleaving, the controller 110 can aggregate and assign a selected portion of the available memory to a cell map entry. The cell map provides an address map for data in the domain that includes the memory subsystem 112. The domain, for example, can include plurality cell map entries, each having a number of subentries. As described herein, the subentries of a given cell map entry can be spread across a plurality of memory subsystems associated with different cells, the distribution being defined by a desired interleave.

The controller 110 also examines the memory and determines the desired interleave for the aggregate memory domain. The desired interleave defines a desired distribution of memory (e.g., how contiguous memory should be spread across the memory subsystems) in the memory domain being interleaved or re-interleaved. The controller 110 or another hardware and/or software structure associated with the controller is employed to migrate data as part of the interleaving process based on the desired interleave that is determined. The manner in which migration is performed can vary, for example, based on whether memory has been added to a domain, deleted from a domain or whether an interleave has been initiated for another reason.

The interleave process, including data migration, can be implemented on a memory block by memory block basis, until the memory has been interleaved as specified by the desired interleave. By implementing the migration on each selected memory block independently, those skilled in the art will understand and appreciate that sufficiently small blocks of memory can be selected to mitigate the impact on system operation. As a result, the interleaving and migration can be implemented dynamically during normal operation without requiring a system reboot.

To further facilitate data migration during interleave, access to each memory block can be blocked until after the migration and interleaving have been completed. Those skilled in the art will understand and appreciate various mechanisms that can be utilized to prevent access to data in memory blocks that are being interleaved, such as including those access prevention mechanisms described herein. Additionally, after migration has been completed, a pointer or other identifier can be employed to identify new interleaved memory locations for data. The migration system 70 can also inform the interleave system 60 that migration has been completed for a given memory block to facilitate subsequent access to the data that has been re-interleaved. The entries and subentries in the cell map 56 are also updated to correspond to the memory interleave that is performed.

Figure 4:
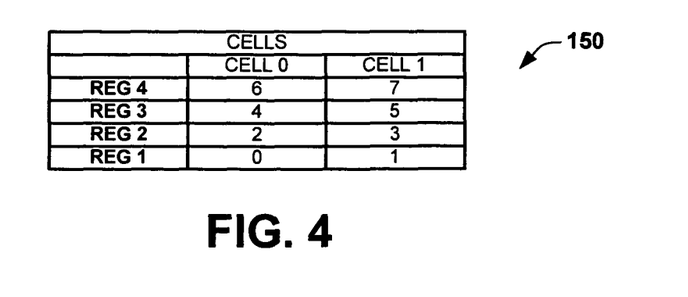
FIG. 4 depicts an example representation of a cell map for an interleaved two-cell memory system.
Figure 5:
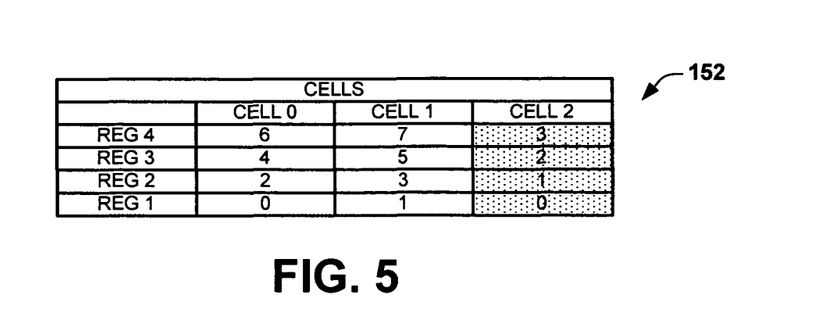
FIG. 5 depicts the representation of the cell map of FIG. 4 after another cell has been added.
Figure 6:
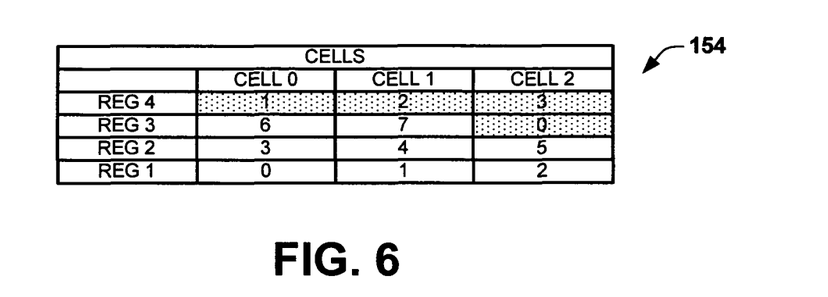
FIG. 6 depicts the representation of the cell map of FIG. 5 after the additional memory cell has been interleaved into the memory system.
Figure 7:
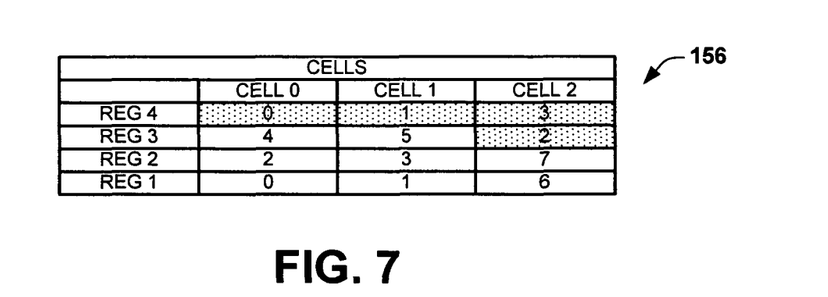
FIG. 7 depicts another representation of the cell map of FIG. 5 after the additional memory cell has been interleaved into the memory system.
Figure 8:
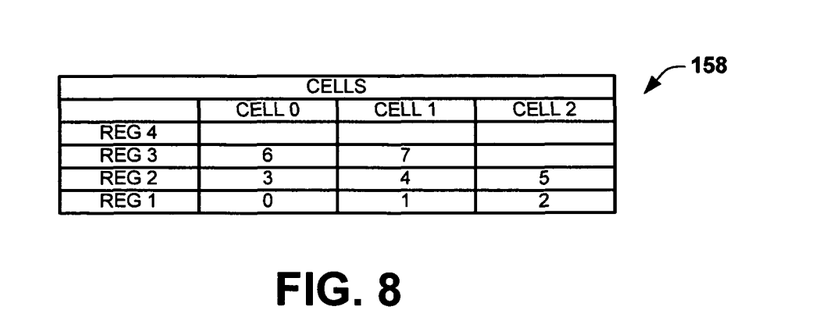
FIG. 8 depicts an example of the cell map of FIG. 6 after memory has been removed from the memory system.
Figure 9:
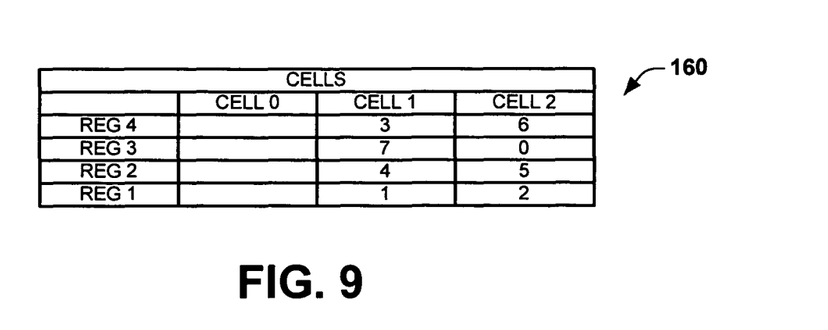
FIG. 9 depicts an example of the cell map of FIG. 8 after the remaining memory cells have been re-interleaved.

In view of the foregoing structural and functional features, examples of re-interleaving will be better appreciated with respect to the representations of cell maps depicted in FIGS. 4-9. In particular, FIGS. 4-6 and 7 depict examples of re-interleaving memory associated with adding a cell having memory and FIGS. 6, 8 and 9 depict an example of re-interleaving associated with memory deletion.

Referring to FIG. 4, a cell map 150 is depicted for two cells, CELL 0 and CELL 1. In this example, each cell includes four memory regions, indicated as REG 1, REG 2, REG 3, and REG 4. Those skilled in the art will understand and appreciate that a given cell can include any number of memory regions, each region being a configurable size chunk of memory. For instance, each given memory region can include 0.5 gigabytes chunk of memory, although other size memory regions can also be utilized.

In the example of FIG. 4, the memory regions in CELL 0 and CELL 1 are interleaved. In particular, the original memory interleave in the cell map 150 assigns each chunk of each cell a number, indicated as 0-7, such as can correspond to a data array that is the aggregate of the chunks (e.g., a four gigabyte data array for a 0.5 gigabyte chunk size). Each memory region, for example, can correspond to a portion of a cache line, a complete cache line or to more than one cache line. Assuming that each memory chunk corresponds to a cache line, each cache line can be assigned to an alternating cell in the cell map 150 to provide a desired original interleave. For example, chunk 0 is assigned to REG 1 of CELL 0, chunk 1 is assigned to REG 1 of CELL 1, and then the array of data revisits cell 0 in which chunk 2 is assigned to REG 2 of CELL 0, and chunk 3 is assigned to REG 2 of CELL 1 and so on, as depicted in FIG. 4. Those skilled in the art will understand and appreciate that other interleave configurations can also be utilized.

By way of further example, the following equations can be utilized by a cell map to identify the location of a given cache line for a desired memory interleave. The operands in the equations are self-descriptive. For instance, a cache_line_address can be represented as follows:

cache_line_address=(global address)shift right by(log2(cache line size))  Eq. 1

Similarly, a chunk number can be expressed as follows:

chunk number=cache_line_address MOD(ways of interleave),  Eq. 2 where the term "ways of interleave" corresponds to a value identifying the number of ways to interleave (e.g., ways of interleave=8 in the example of FIG. 4). Each chunk of memory also can include a sub_chunk address for that can be expressed as follows in Eq. 3:

sub_chunk_address=cache_line_address shift right by(log2(ways of interleave)).

FIG. 5 depicts an example a cell map 152 in which a new cell (indicated as CELL 2) has been added to system represented by the cell map 150 of FIG. 4. CELL 2 includes memory chunks 0, 1, 2 and 3 assigned to the respective regions REG 1-REG 4 of CELL 2. Stippling is utilized in FIG. 5 to differentiate between the memory chunks associated with CELL 2 and the memory chunks of the original interleaved cells.

In FIG. 5, the chunks of cell 2 are not interleaved with the other cells in the system. The interleave arrangement depicted in FIG. 5 corresponds to a sub-optimal interleave in which a contiguous memory region (e.g., 2 gigabytes of CELL 2) is essentially non-interleaved with the other cells in the system. The interleave of CELL 2 can be considered sub-optimal. For example, it is possible that a hot spot could develop associated with the memory region of cell 2 since the cell controller of CELL 2 might be activated continually when accessing data in the contiguous memory region (chunks 0, 1, 2 and 3 of CELL 2).

FIG. 6 depicts an example of a cell map 154 for a desired interleave that can be provided by interleaving the newly added memory of CELL 2 with the originally interleaved cells, namely, with CELL 0 and CELL 1. In order to interleave CELL 2 with the other cells, a corresponding interleave system examines the memory associated with the cells being interleaved to determine what amount of memory is available for re-interleaving. The interleaved distribution can be stored as interleaved data in memory and utilized to control migration of data memory to implement the memory interleave. For example, to re-interleave, the memory regions can be swapped or old memory can be migrated before the new memory associated with CELL 2 is utilized.

The resulting interleave depicted in FIG. 6 can be implemented in stages. For example, migration can first be implemented by moving memory chunks from one or both of the original interleaved cells CELL 0 and CELL 1. The re-interleave can also include migrating data between CELL 0 and CELL 1. In the example of FIG. 6, every other memory chunk is assigned to a different cell, thereby spreading the contiguous address space across the respective cells, namely CELL 0, CELL 1 and CELL 2. In REG 3, for instance, chunk 6 is assigned to CELL 0, chunk 7 is assigned to CELL 1 and chunk 0 of the newly added CELL 2, which was originally in REG 1 of CELL 2 (FIG. 5), has been assigned to REG 3 of CELL 2. The next chunk 1, which was originally in REG 2 of CELL 2 (FIG. 5), revisits CELL 0 such that chunk 1 of the newly added cell 2 is assigned to REG 4 of CELL 0. As a result, the interleave implemented to provide the cell map 154 in FIG. 6 has reassigned a contiguous array of memory as consecutive memory chunks to alternating ones of the respective cells. The actual migration of the respective chunks can be performed on respective configurable portions or memory blocks (e.g., subchunks) of each respective memory region being moved, such as described herein.

FIG. 7 depicts an example of a cell map 156 for an alternative desired interleave from that shown in FIG. 6. The interleave represented in the cell map 156 can be provided by interleaving the newly added memory of CELL 2 (as depicted in FIG. 5) with the previously interleaved cells, namely, with CELL 0 and CELL 1 (as depicted in FIG. 4). The interleave depicted in FIG. 7 can achieve similar performance to the interleave arrangement of FIG. 6, but can be implemented with fewer migration steps than the example of FIG. 6. In order to implement the interleave of FIG. 7, the interleave system determines a desired interleave distribution of memory chunks in cells (e.g., CELL 0, CELL 1 and CELL 2). The distribution of memory chunks in the cell map 156 is substantially the same as the cell map 154 of FIG. 6. In order to implement the re-interleave to modify the interleave arrangement illustrated in FIG. 5 to provide the interleave arrangement of FIG. 7, chunks 6 and 7, which were originally in REG 4 of CELL 0 and CELL 1 are swapped with chunks 0 and 1 of the newly added CELL 2. As a result, chunks 0 and 1, which were originally in REG 1 and REG 2, respectively of CELL 2 (FIG. 5), are moved respectively to REG 4 of CELL 0 and to REG 4 of CELL 1. By providing a similar distribution of memory amongst the cells CELL 0, CELL 1 and CELL 2 of the cell map, this approach is able to achieve similar performance to the interleave of FIG. 6, although implemented with fewer migration steps. Those skilled in the art will appreciate various other approaches that can be employed to provide a desired interleave when memory is added.

FIGS. 6, 8 and 9 depict an example of a re-interleave that can be implemented in response to deleting address space associated with a given cell, namely CELL 0. This example begins with the original interleave shown in the cell map 154 of FIG. 6, and assumes that CELL 0 is to be deleted. Since CELL 0 corresponds to a predetermined size address space (e.g., two gigabytes), the interleave system instructs the operating system to locate a corresponding memory region of substantially equal size in the cells that will remain after the deletion. This may include vacating some or all of the memory that will be required to implement the re-interleave. Since in this example each of the memory regions is assumed to be the same size, the interleave system can instruct the operating system to remove the portion of interleaved memory corresponding to the shaded region of FIG. 6, which corresponds to memory regions of original CELL 2 added in FIG. 5. FIG. 8 depicts an intermediate phase of the re-interleave in which the shaded region from FIG. 6 has been vacated from the respective cells in preparation for migration of data from CELL 0.

Those skilled in the art will understand and appreciate that any available (e.g., unused) memory in the interleaved memory can be vacated to provide space for the data that is being vacated from the cell (or cells) being deleted. After the respective memory region has been vacated by the operating system, the corresponding chunks of memory from CELL 0 can now be migrated in to the vacated regions of CELL 1 and CELL 2, such as by sequentially moving desired size memory blocks of each memory chunk (e.g., cache line).

As shown in FIG. 9, memory chunks 0, 3 and 6, which were in CELL 0 of the originally interleaved memory, have been migrated to CELL 1 and CELL 2. In particular, chunk 0 has been migrated to REG 3 of CELL 2, chunk 3 has been migrated to REG 4 of CELL 1, and chunk 6 has been migrated to REG 4 of CELL 2. This migration completes the memory re-interleave such that the remaining memory of CELL 1 and CELL 2 are substantially evenly distributed.

Those skilled in the art will understand and appreciate that the interleave system described above enables re-interleave of systems before and after memory addition or deletion to improve performance. Additionally, the interleave system enables deletion of memory on already interleaved systems. The re-interleaving can be implemented without requiring system reboot or downtime since the migration occurs in configurable blocks of memory.

Figure 10:
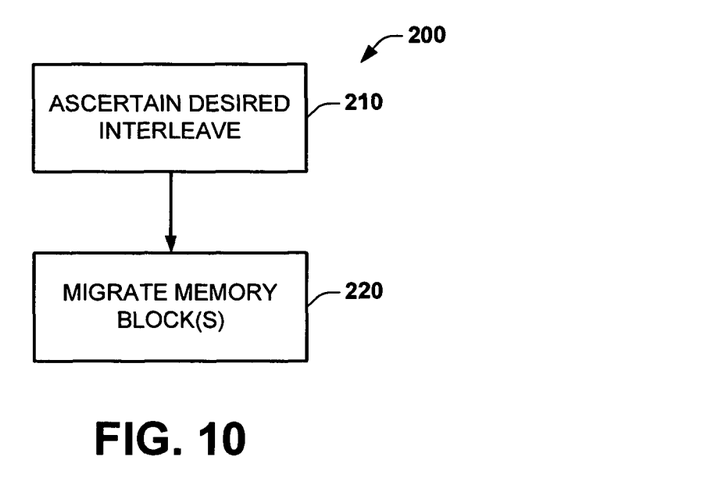
FIG. 10 depicts a flow diagram illustrating a method.
Figure 11:
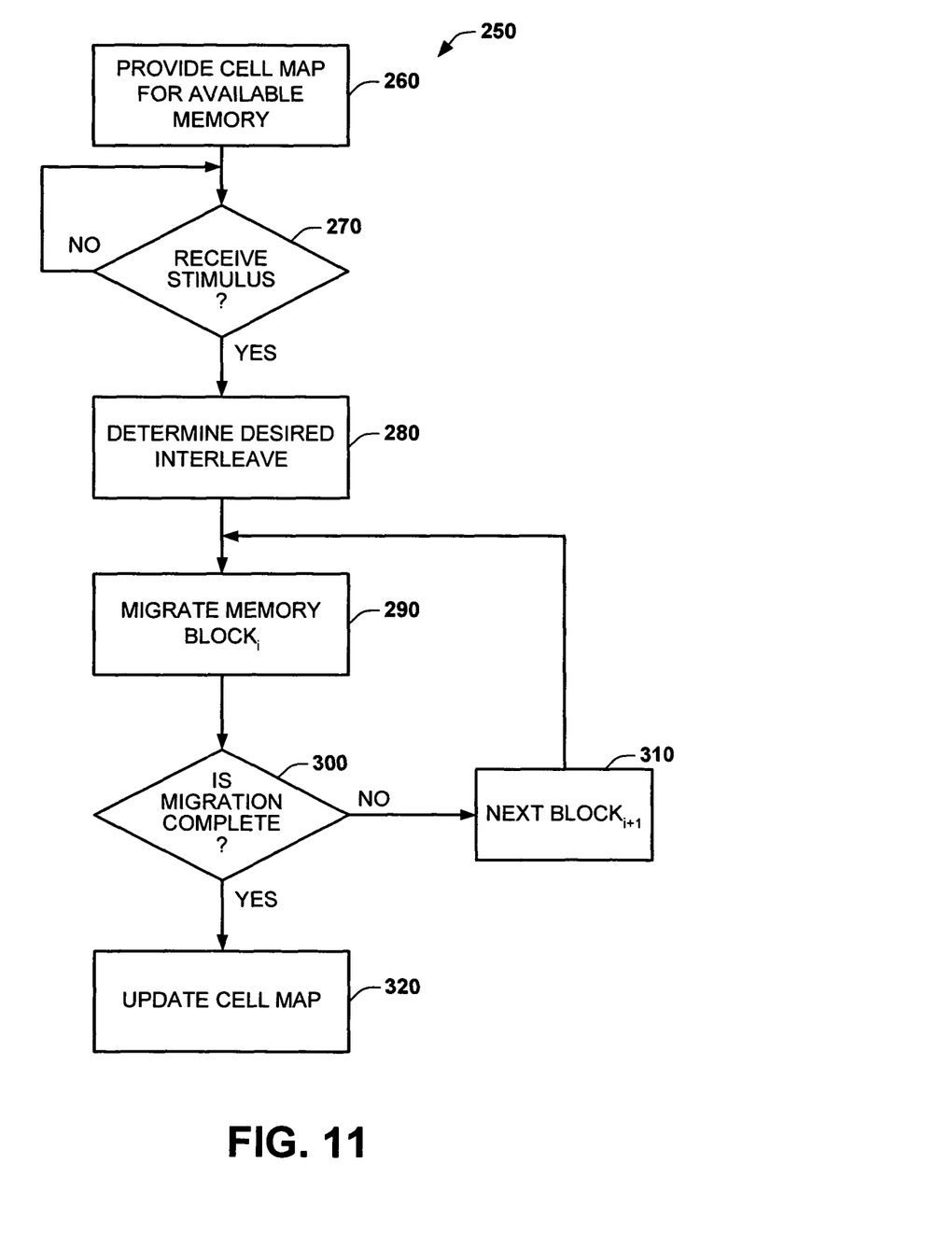
FIG. 11 depicts a flow diagram illustrating another method for interleaving memory.

In view of the foregoing structural and functional features described above, certain methods will be better appreciated with reference to FIGS. 10 and 11. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), software (e.g., as executable instructions running on one or more processors or controllers), or any combination thereof.

FIG. 10 depicts a method 200 that includes ascertaining a desired memory interleave for at least a selected portion of a distributed memory system, as shown at 210. The method 200 also includes migrating blocks of data from first respective memory locations associated with the blocks of data to second respective memory locations based on the desired memory interleave, as shown at 220.

FIG. 11 depicts a method 250 that can be employed to interleave memory, such as in a distributed memory multi-processor system. The method begins at 260 in which a cell map is provided for available memory in the system. The cell map, which can be implemented as hardware, software or a combination of hardware and software (e.g., CAM memory), is able to identify a cell and/or other memory location information in response to an address tag. The address tag, for example, can be provided in a request for data. The cell map can include an original interleave, which may have been implemented by the method 250 or by another approach, such as can occur at system boot.

At 270, a determination is made as to whether a stimulus has been received that requires interleaving to be implemented. For example, the stimulus can correspond to a change in the memory structure of the system, such as in response to adding or removing memory (e.g., as may be contained on a cell board). Alternatively or additionally, the stimulus can correspond to an instruction or command to initiate interleave or re-interleave on a selected memory. When no such stimulus is received (NO), the method 250 can remain at 270. When a stimulus is received (YES), the method proceeds to 280.

At 280, a desired interleave is determined. The desired interleave can include ascertaining available memory and employing an algorithm to determine a distribution of memory chunks to improve performance and mitigate hot spots, such as described herein. From 280, the method proceeds to 290. At 290, a memory block ($BLOCK_i$) is migrated. The $BLOCK_i$ can be any configurable size (e.g., 64 bytes, 64 Kbytes, etc.). The migration of $BLOCK_i$ further can involve temporarily blocking access to data being migrated, which can be implemented as mentioned herein, for example.

At 300, a determination is made as to whether migration is complete. This determination can be made based on whether any additional memory blocks are required to be moved to implement the desired interleave, as determined at 280. If the migration is not complete (NO), the method proceeds to 310 in which the next memory block is accessed for migration. From 310, the method returns to 290 for migrating the next memory block $BLOCK_i$ (e.g., i=i+1). Since sufficiently small blocks of memory can be migrated individually to implement the desired interleave, the impact on normal system operation can be mitigated. As a result, the method 250 can operate to interleave or re-interleave memory in the system without requiring system reboot or stalling system operations.

After it has been determined at 300 that the migration has been completed (YES), the method proceeds to 320 in which the cell map is updated. As a result, a cell controller having access to the cell map can properly identify locations for data, thereby facilitating access to such data. For instance, the cell map can identify locations for data on the same cell as the cell controller resides or alternatively, the location can be remote requiring access through one or more interconnects.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system comprising:
a distributed memory system;
an interleave system to determine a target interleave for at least a selected portion of the distributed memory system;
a mapping system to:
provide memory location information to identify a distribution of memory in the distributed memory system corresponding to the target interleave; and
a migration system associated with the interleave system to:
in response to a stimulus to cause migration of data, set status indicators for respective first blocks of data in the selected portion for temporarily preventing access to the first blocks;
in response to the set status indicators, temporarily prevent access to the first blocks of data in the selected portion while allowing access to second blocks of data that are not part of the selected portion;

while access to the first blocks of data is temporarily prevented, migrate the first blocks of data from first interleaved memory locations of the distributed memory system to second interleaved memory locations of the distributed memory system to implement the target interleave in an absence of a system boot process; and individually reset the status indicator for each respective one of the first blocks of data in response to the respective first block of data having been migrated to a corresponding one of the second interleaved memory locations.

2. The system of claim 1, wherein the mapping system includes a cell map entry that includes a plurality of subentries associated with memory segments interleaved across a set of cells in the distributed memory system, each of the subentries corresponding to a configurable region of contiguous memory at respective physical locations in the distributed memory system.

3. The system of claim 1, further comprising at least one memory controller associated with the distributed memory system, the memory controller accessing the data from at least one memory location based on the memory location information provided by the mapping system.

4. The system of claim 1, wherein the interleave system is configured to invoke the migration system to perform the migrating in response to the stimulus.

5. The system of claim 4, wherein the stimulus comprises a run-time stimulus received by the interleave system subsequent to a system boot process.

6. The system of claim 4, wherein the stimulus comprises at least one of adding memory into the distributed memory system, deleting memory from the distributed memory system, and reallocating memory among partitions in the distributed memory system.

7. The system of claim 6, wherein the at least one of adding memory into the distributed memory system, deleting memory from the distributed memory system, and reallocating memory among partitions in the distributed memory system modifies the distributed memory system, the migration system being configured to migrate the first blocks of data to implement the target interleave across the modified distributed memory system.

8. The system of claim 1, further comprising:
a plurality of cells communicatively coupled to each other, each of the plurality of cells including at least one processor, a main memory system, and a cell controller, at least one cell controller in a respective cell including the interleave system, wherein the migration system is configured to selectively migrate the first blocks of data across the main memory systems of the plurality of cells to implement the target interleave.

9. The system of claim 1, further comprising:
a controller configured to:
load run-time requests for accessing the selected portion of the distributed memory system into a queue structure during the migrating of the first blocks of data, and process the run-time requests for accessing the first blocks of data upon completion of the migrating.

10. The system of claim 1, wherein the mapping system comprises:
a first cell map entry comprising a first plurality of memory subentries interleaved across a set of cells of the distributed memory system; and a second cell map entry comprising a second plurality of memory subentries interleaved across the set of cells of the distributed memory system.

11. The system of claim 1, wherein the migration system is configured to employ a virtual memory in the distributed memory system, corresponding to at least one memory device outside of the distributed memory system, by temporarily migrating the first blocks of data to the virtual memory and subsequently retrieving the first blocks of data from the virtual memory for migration to the second interleaved memory locations.

12. The system of claim 1, wherein the migration system is configured to set the status indicators prior to migration of the first blocks of data.

13. The system of claim 1, wherein the migrating is performed on a first block of data by first block of data basis, and wherein individually resetting the status indicator for a given one of the first blocks of data in response to the given first block of data having been migrated is performed without resetting the status indicator for another one of the first blocks of data that has not yet been migrated.

14. The system of claim 1, wherein each of the status indicators is set to a first value for temporarily preventing access to a respective first block of data, and each of the status indicators is reset to a second, different value for allowing access to a respective first block of data.

15. A distributed memory, multi-processor system comprising:
a plurality of cells communicatively coupled to each other;
each of the plurality of cells comprising a cell controller and at least one cell memory, the cell memories of the plurality of cells collectively defining a memory system; and
the cell controller of at least one of the plurality of cells comprising:
an interleave system configured to generate interleave data corresponding to a target memory interleave for a selected portion of the memory system; and
a migration system coupled to the interleave system to:
in response to a stimulus to cause migration of data, set status indicators for respective first blocks of data in the selected portion for temporarily preventing access to the first blocks;
in response to the set status indicators, temporarily prevent access to the first blocks of data in the selected portion while allowing access to second blocks of data that are not part of the selected portion;
while access to the first blocks of data is temporarily prevented, migrate, in response to the stimulus, the first blocks of data from first interleaved memory locations of the memory system to second interleaved memory locations of the memory system to implement the target memory interleave in an absence of a system boot process; and
individually reset the status indicator for each respective one of the first blocks of data in response to the respective first block of data having been migrated to a corresponding one of the second interleaved memory locations.

16. The system of claim 15, wherein the stimulus comprises at least one of adding memory to the memory system, deleting memory from the memory system, and a request to reallocate memory in the memory system.

17. The system of claim 15, further comprising a mapping system to provide memory location information in response to an input associated with requested data, and to update the memory location information according to the target interleave.

18. A method comprising:
- ascertaining a target memory interleave for at least a selected portion of a distributed memory system;
- in response to a stimulus to cause migration of data, setting status indicators for respective first blocks of data in the selected portion for temporarily preventing access to the first blocks;
- in response to the set status indicators, temporarily preventing access to the first blocks of data in the selected portion while allowing access to second blocks of data that are not part of the selected portion;
- while access to the first blocks of data is temporarily prevented, migrating the first blocks of data from first respective memory locations associated with the first blocks of data to second respective memory locations based on the target memory interleave in response to the stimulus and in an absence of a system boot process;
- updating entries in a cell map to identify the second memory locations for the first blocks of data corresponding to the target memory interleave; and
- individually resetting the status indicator for each respective one of the first blocks of data in response to the respective first block of data having been migrated to a corresponding one of the second memory locations.

19. The method of claim 18, further comprising:
- providing memory location information from the cell map; and
- accessing data from at least one physical memory location of the memory system by a memory controller based on the memory location information.

20. The method of claim 18, wherein the stimulus comprises at least one of adding memory into the memory system, deleting memory from the memory system, and reallocating memory in the memory system.

21. The method of claim 18, wherein setting the status indicators for temporarily preventing access to the first blocks of data is performed prior to migrating the first blocks of data.

22. The method of claim 18, wherein temporarily preventing access to the first blocks of data comprises loading run-time requests for accessing the first blocks of data into a queue structure during the migration of the first blocks of data, and wherein re-allowing access to the first blocks of data comprises processing the run-time requests for accessing the first blocks of data upon completion of the migration of the first blocks of data.

23. The method of claim 18, wherein the migrating is performed on a first block of data by first block of data basis, and wherein individually resetting the status indicator for a given one of the first blocks of data in response to the given first block of data having been migrated is performed without resetting the status indicator for another one of the first blocks of data that has not yet been migrated.

24. The method of claim 18, wherein each of the status indicators is set to a first value for temporarily preventing access to a respective first block of data, and each of the status indicators is reset to a second, different value for allowing access to a respective first block of data.

* * * * *